United States Patent [19]

Schürger

[11] 3,814,486

[45] June 4, 1974

[54] HYDROSTATIC THRUST BEARING SUPPORTS

[75] Inventor: Rainer Schürger, Arnstein, Germany

[73] Assignee: SKF Industrial Trading and Development Company N.V., Amsterdam, Netherlands

[22] Filed: July 28, 1972

[21] Appl. No.: 276,097

[30] Foreign Application Priority Data

July 31, 1971 Germany............................ 2138474

[52] U.S. Cl. ............................................. 308/160
[51] Int. Cl. .......................................... F16c 17/04
[58] Field of Search ............. 308/160, 230, 73, 231

[56] References Cited
UNITED STATES PATENTS 3,672,733  6/1972  Arsenius et al..................... 308/160

FOREIGN PATENTS OR APPLICATIONS 1,102,638  5/1955  France............................... 308/160

*Primary Examiner*—Charles J. Myhre
*Assistant Examiner*—Frank Susko
*Attorney, Agent, or Firm*—Murray Schaffer

[57] ABSTRACT

An arrangement for axially supporting a shaft or the like comprising a housing in which the end of the shaft is journalled. A hydrostatic thrust bearing is arranged along the end of the shaft within the housing. The thrust bearing comprises a first disk fixed relative to the shaft end, a second disk fixed relative to the housing and means for feeding fluid under pressure therebetween. An annular piston is arranged between the first and second disks to be axially movable, under action of the fluid, relative to and between said first and second disks, responsive to changes in pressure caused by external loading.

6 Claims, 3 Drawing Figures

HYDROSTATIC THRUST BEARING SUPPORTS

BACKGROUND OF THE INVENTION

The present invention relates to an arrangement for axially supporting rotary shafts and the like with hydrostatic axial thrust bearings.

Hydrostatic bearings of this kind have become known through British Pat. No. 1,143,960 and U.S. Pat. No. 3,240,541. Such bearings comprise a pair of disks between which a hydraulic fluid is fed, under pressure, which fluid maintains the shaft against axial loading forces. With the bearings described in these patents it is possible to permit forces to be absorbed in both axial directions. The axial load capacity of these bearings is however relatively small and therefore not very useful under heavy load conditions. Furthermore, such bearings are not very stable, being easily responsive to changes in pressure and varying loads and it is often difficult to stabilize such bearings in an equilibrium condition.

It is the object of the present invention to provide an axial support for a shaft employing hydrostatic thrust bearings which overcomes the defects of the prior art.

It is another object of the present invention to provide an arrangement for axially supporting shafts wherein great axial forces can be absorbed.

It is still another object of the present invention to provide an arrangement for axially supporting shafts employing two or more hydrostatic thrust bearings in which effective means are provided for stabilizing the same, and providing for a proportionate sharing of the force load, over each of the thrust bearings.

These objects as well as others, together with numerous advantages will be observed from the following disclosure of the present invention.

SUMMARY OF INVENTION

According to the present invention an arrangement for axially supporting a shaft or the like is provided comprising a housing in which the end of the shaft is journalled. A hydrostatic thrust bearing is arranged along the end of the shaft within the housing. The thrust bearing comprises a first disk fixed relative to the shaft end, a second disk fixed relative to the housing and means for feeding fluid under pressure therebetween. An annular piston is arranged between the first and second disks to be axially movable, under action of the fluid, relative to and between said first and second disks, responsive to changes in pressure caused by external loading.

Preferably two or more thrust bearings of a similar type are employed, and arranged in tandem one behind the other along the end of the shaft. This permits the absorption of greater axial forces than in the prior art. Since the piston is movable between the disks, the thrust bearing is capable of more easily stabilizing and obtaining an equilibrium condition, since variable volumetric spaces are provided on either side of the piston.

When two or more thrust bearings are employed it is preferred that means be provided for conducting hydraulic fluid between each, so that each thrust bearing can be placed in equilibrium with the other. In one form a capillary bore connects both pistons surfaces while in another a bore extends through the shaft between thrust bearings.

Since, the support is stabilized by its own means, a state of equilibrium is constantly obtained. Thus, no narrow production tolerances have to be observed in its manufacture., and the bearing may be made relatively inexpensively.

Full details of the present invention follow herein and will be seen in the accompanying drawings.

DESCRIPTION OF INVENTION

The drawings are taken through a diameter of the support and in general the support is symmetrical and concentric about the axis of the shaft being supported, the axis being indicated by the thin, dot-dash line.

Figure 1:
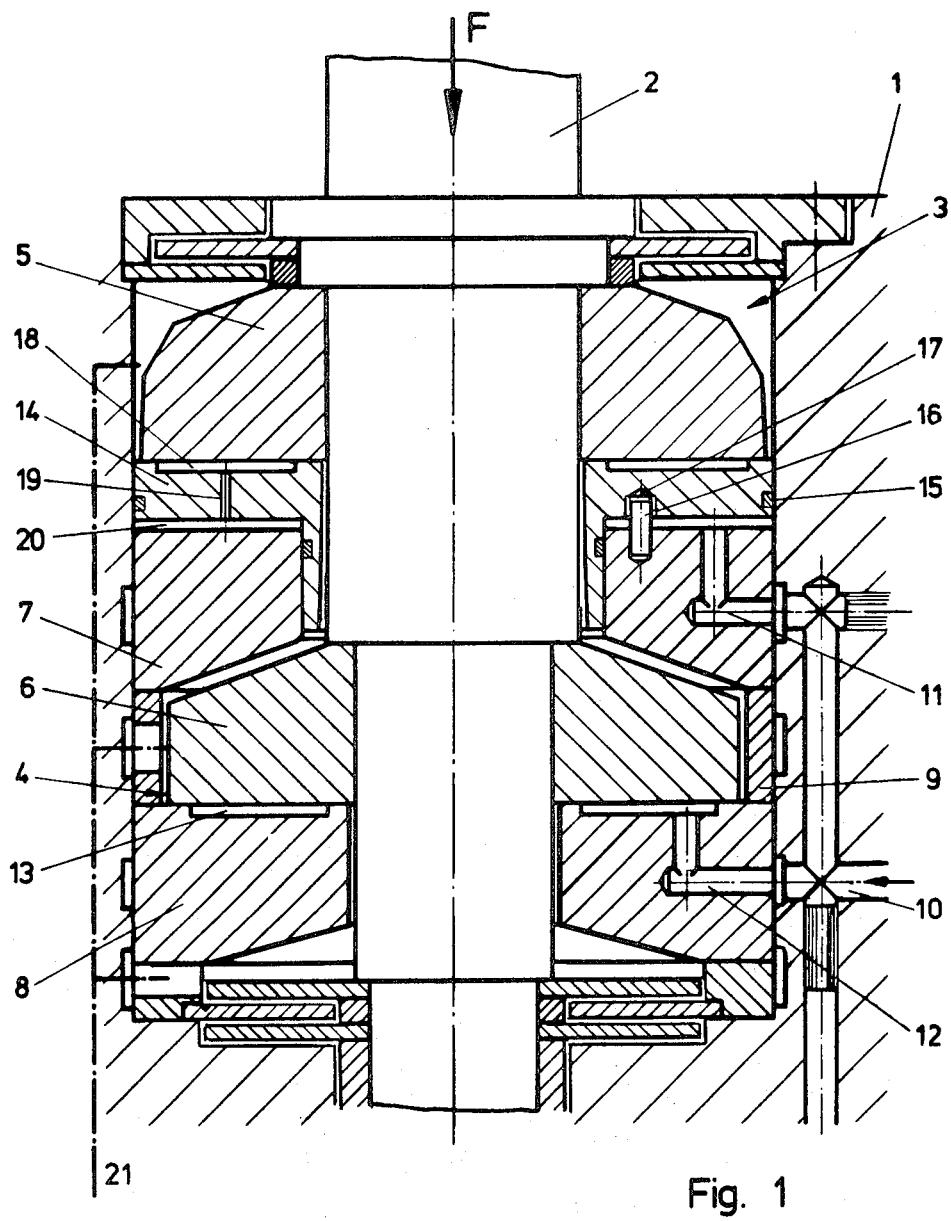
FIG. 1 is a vertical section of an axial shaft support formed with thrust bearings according to the present invention.

As seen in FIG. 1 a cylindrical bearing housing 1 is provided in which the end of a shaft 2 is coaxially journalled for rotation about the axis. The means for journalling the shaft are shown but not described herein since they are well known and conventional. The end of the shaft 2 is stepped in coaxial portions of lessened diameter. Arranged in tandem along the stepped shaft, one behind the other, are a pair of similar hydrostatic thrust bearings generally depicted by the numerals 3 and 4. Each thrust bearing comprise respectively a first or shaft disk designated by numerals 5 and 6 fixed on the shaft as by press fittings or the like, and a second or housing disk designated by numerals 7 and 8 fixed, as by keying on to the inner wall of the housing 1. The housing disks 7 and 8 are axially separated by a spacer ring or bushing 9 which surrounds and is spaced from the shaft disk 6. The inner diameter of the housing disks 7 and 8 and the outer diameter of shaft disks 5 and 6 are dimensioned and contoured so as to permit flow of lubricant between them and the respective radially adjacent portion of the shaft 2 and housing 1, respectively.

An inlet conduit 10 is provided through which a hydraulic media or fluid, such as a lubricant, under pressure is fed. The conduit 10 communicates with a suitable source of such lubricant in the known manner, and leads to a pair of channels 11 and 12 extending through the respective housing disks 7 and 8. The channel 12 opens into an annular groove, forming a fluid bearing pocket 13, cut out in a relatively narrow band on the upper face of the housing disk 8, over which the shaft disk 6 lies. Between the shaft disk 5 and its associated housing disk 7, of the upper bearing 3 there is arranged an annular or ring like piston 14, which is axially movable relative to and between the adjacent faces of each of the disks 5 and 7, thereby providing variable spaces therebetween. A piston ring 15 or similar type of annular sealing member is set within circumferential grooves and seals the piston 10 with respect to the inner walls of the housing 1 and the housing disk 7. One or more cylinder pins such as shown at 16, fixed in the housing disk 7, extend into corresponding holes such as shown at 17 formed in the adjacent surface of the annular piston 14, to fix the piston 14 against rotary movement relative to the shaft. The depth of the holes such as that shown at 17 is such that the space 20 between the piston 14 and the housing disk 7, has a defined minimum height. The piston 14 is further provided with an annular groove, cut in a narrow band into its face adjacent the shaft disk 5 to form a fluid bearing pocket 18, similar to the pocket 13. A capillary bore 19 extends axially through the piston 14 connecting the bearing pocket 18 and the space 20. A conventional or suitable outlet line 21 (dot-dash line in drawing) is provided by which the fluid may be expelled. As seen, the thrust bearings are each formed of a pair of cooperating disks, between which is a space for fluid under pressure. While two such thrust bearings 3 and 4 are shown, a suitable support can be made employing only one such thrust bearing, or even employing several of them all in tandem. When more than one thrust bearing is employed, it is preferred that the piston be arranged within that one closest to the shaft, (i.e., the upper end seen in the drawing, and closest to the shaft proper).

In operation, the pressurized hydraulic fluid, as for example a suitable lubricant or oil, passes through the channel 12 into the pocket 13 of the lower hydrostatic thrust bearing 4. Similarly, fluid passes simultaneously through the channel 11 into the space 20 of the upper hydrostatic thrust bearing 3, where it passes further through the capillary bore 19 into the bearing pocket 18. The fluid exerts, in the pocket 13, a pressure against the shaft disk 6, causing the shaft to rise or move outwardly, when a counter-force F is exerted on it. Simultaneously, the same pressure is urged also in space 20 pressing the piston 14 against the disk 5. Since in this instance no fluid can escape from the pocket 18, there is no flow of fluid through the capillary bore 19 and therefore also no throttling or reactive loss. Also, fluid in the pocket 18 exerts the same pressure against the disk 5 as does the fluid in space 20.

The effective pressure area on the pocket 18 is somewhat greater than the corresponding pressure area on space 20, as will be obvious from the drawing, so that in the next succeeding movement the piston 14 is forced backward away from the disk 5. At this time fluid is permitted to flow out of the pocket 18 so that the capillary bore 19 functions as a throttle. As a result of the fall in pressure caused by the flow of fluid through capillary bore 19, the fluid in pocket 18 provides a pressure smaller than that in the space 20. As a result of this situation, the fluid pressure in the space 20 seeks to act against the piston 14 to again force it (upwards or outwards) against the disk 5. This alternate or back and forth movement of the piston continues until a stable, equilibrium condition is established in all the spaces or pockets of fluid. As soon as this equilibrium is obtained, both the hydrostatic thrust bearings 3 and 4 take up a balanced or equal proportion of the bearing load, or force F. Any subsequent changes in load F are easily compensated for in the same manner.

Figure 2:
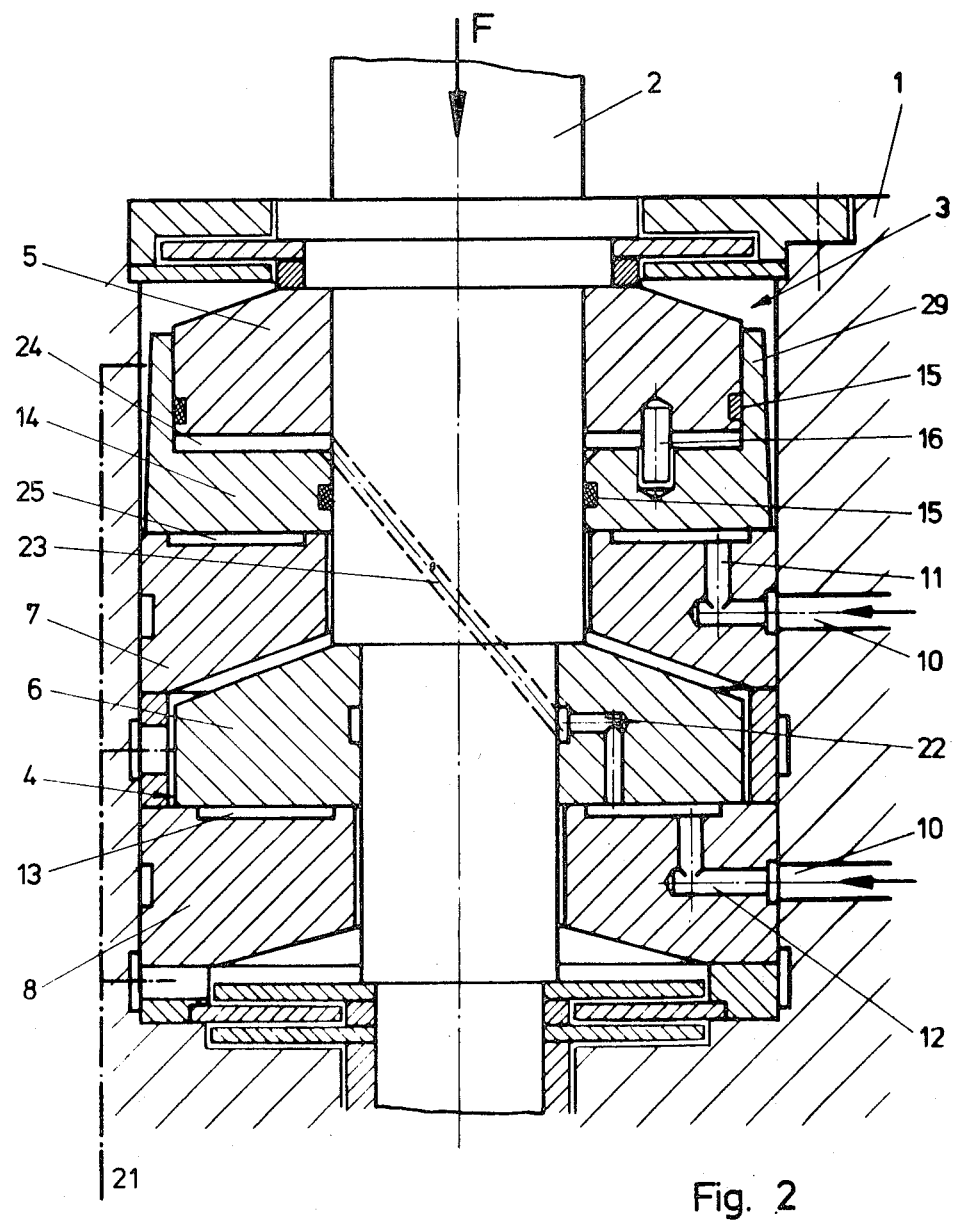
FIGS. 2 and 3 are views, similar to FIG. 1, of a second and third embodiment, respectively.

In the construction shown in FIG. 2, the bearing is similar to that of FIG. 1 and corresponding parts are marked with the same reference numerals. Here, however, the piston 14, while arranged between the shaft disk 5 and the housing disk 7, is held against rotary movement by one or more cylinder pins such as that at 16 secured in the shaft disk 5 itself. The piston 14 also has an annular upward projecting wall 29 surrounding the periphery of the disk 5 and is provided with sealing piston rings such as that shown at 15 to seal it with respect to the shaft 2 as well as the disk 5. To permit levelling of the pressure between both of the thrust bearings 3 and 4, the piston 14 is not provided with a capillary bore, but instead the shaft disk 6 is provided with a duct 22 communicating with a bore 23 extending angularly through the shaft 2, which in turn communicates with an annular space 24 formed between the shaft disk 5 and piston 14. By seating the cylinder pins such as that shown at 16 in a predimensioned hole just as in FIG. 1, the height of space 24 is determined. The upper face of the housing disk 7 is provided with an annular bearing pocket 25.

The thrust bearings 3 and 4 are interconnected and the operation and function of the embodiment of FIG. 2 is similar to that described above. While a common conduit inlet to the channels 11 and 12 is not shown, it will be noted that each pocket 13 and 25 must simultaneously receive the same amount of pressurized fluid at the same time. This can be obtained, for example, by employing only one suitable pump and regulating valves in the independent inlet conduits 10. If two pumps are used, it must be insured that they provide the same volume of fluid flow. The fluid passing through the pocket 13 passes further through channels 22 and 23 into the space 24 and exerts a pressure against the piston 14, urging it against the housing disk 7. At the same time, a similar volumetric flow into pocket 25, as in pocket 13, is effected, shoving or pushing the piston 14 contrarywise. This occurs for successive alternations until there is also obtained in this construction a balancing or equalization of pressure on both of the faces of the piston 14 and until the pressure in both the pockets 13 and 25 is equalized. As a result the load created by the force F is balanced between each of the bearings 3 and 4.

Figure 3:
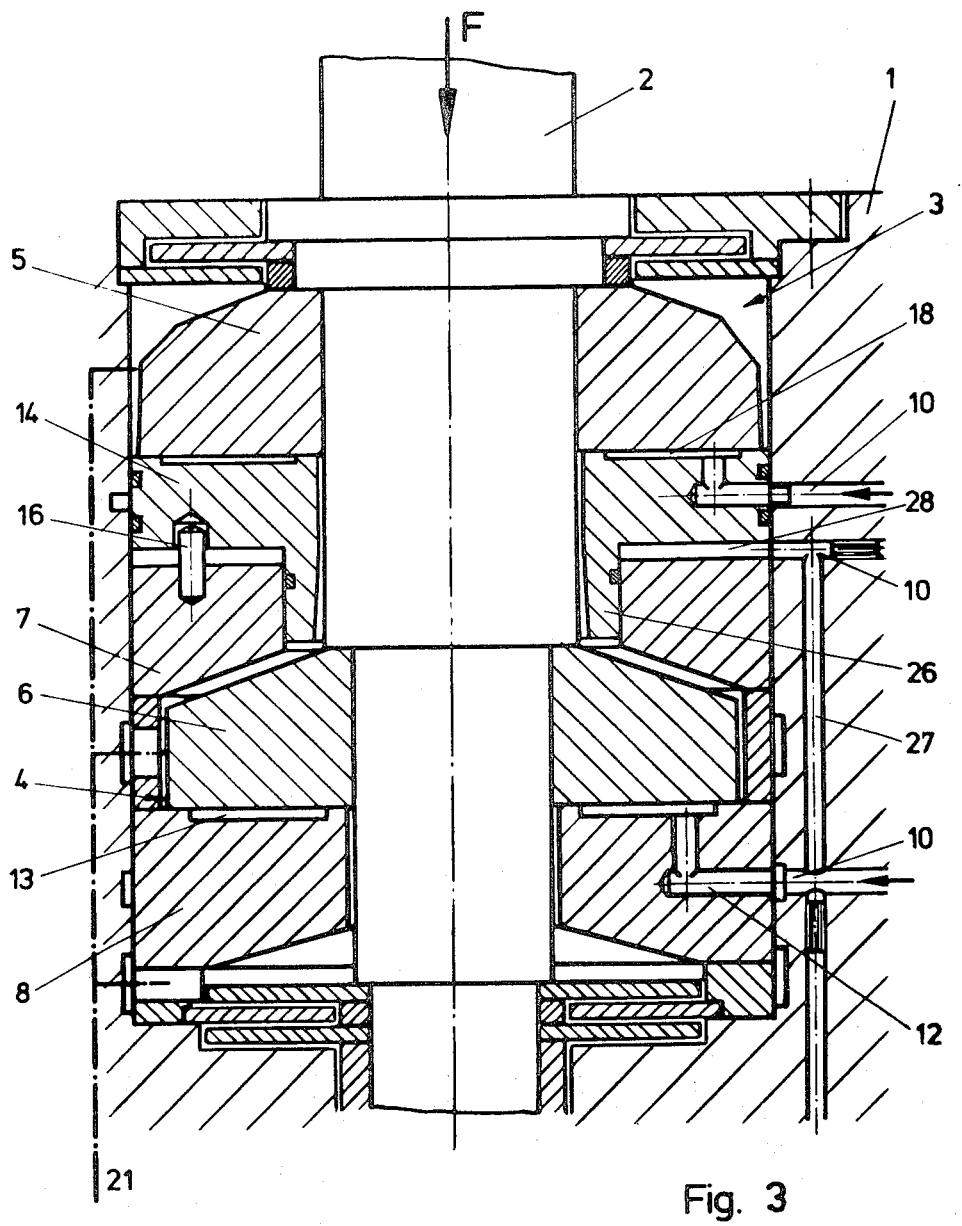

Another variant is shown in FIG. 3, by which the pocket 13 is formed in the housing disk 8, while the second pocket 18 is formed as in the example of FIG. 1, in the face of piston 14. The fluid is fed via a connecting conduit 27, through the inlet 10 into the pocket 13 and directly into a space 28 formed between the piston 14 and the housing disk 7. Another inlet conduit 10 provides for fluid to be fed into the space 18. As in FIG. 2, it must be insured that the volumetric flow of the fluid into both the bearings 3 and 4 is substantially equal. The piston 14 is as in FIG. 1 held against rotation by pins such as that shown at 16 fixed into the disk 7 at a height to provide the space 28 between them. The piston 14 is provided here, as in FIG. 1 with a depending annular wall 26 spaced from the shaft 2, and which is fit in sealed condition against the inner wall of the housing disk 7.

The operation of the embodiment of FIG. 3 is basically similar to that of FIG. 2. An external load through an axial force F is absorbed and borne by the fluid pressure created in pockets 13 and 18. Since the channel 27 connects the pockets 13 with the space 28, the pressure in space 28 is equalized with that of the pocket 18. Thus, the pressure above and below the piston is equalized as described above and a stable equilibrium between the bearings 3 and 4 is obtained. As a result both bearings 3 and 4 can be made to bear proportionately equal loads.

From the foregoing it will be obvious that the several objects of the present invention have been obtained. Several embodiments have been shown, and it will be clear that other changes and modifications are possible. Accordingly, the present disclosure is to be taken as illustrative and not as limiting of the scope of the invention.

What is claimed:

1. An arrangement for axially supporting a shaft and the like comprising a housing in which the end of said shaft is journalled and at least two hydrostatic thrust bearings arranged along said end within said housing, each of said thrust bearings comprising a first disk fixed relative to said shaft end, a second disk fixed relative to said housing and means for feeding fluid under pressure therebetween, an annular piston arranged between the first and second disks of one thrust bearing adjacent said shaft to be axially movable under action of said fluid relative to and between said first and second disks thereof, under changes in pressure caused by external loading and a channel in said shaft communicating with the space between the piston and the associated first disk of one of said thrust bearings and the first and second disks of the other thrust bearing.

2. The arrangement according to claim 1 wherein the means for feeding fluid between said disks comprise a channel extending through said second disks.

3. The arrangement according to claim 1 including channel means for communicating between the thrust bearings to permit equalization of fluid pressure therebetween.

4. The arrangement according to claim 1 wherein the means for feeding said fluid to each of said thrust bearings are connected in common to a source of fluid under pressure.

5. The arrangement according to claim 1 wherein said piston is held against rotary movement relative to said shaft.

6. The arrangement according to claim 5 wherein said piston is secured against rotary movement by pins fixed within said first disk.

* * * * *